(12) United States Patent
Stull et al.

(10) Patent No.: US 11,022,429 B2
(45) Date of Patent: Jun. 1, 2021

(54) METHOD FOR REAL-TIME INSPECTION OF STRUCTURAL COMPONENTS

(71) Applicant: Triad National Security, LLC, Los Alamos, NM (US)

(72) Inventors: Nicholas D. Stull, Los Alamos, NM (US); Eric Brian Flynn, Los Alamos, NM (US); Matthew David Mascarenas, Lakeside, CA (US)

(73) Assignee: Triad National Security, LLC, Los Alamos, NM (US)

( * ) Notice: Subject to any disclaimer, the term of this patent is extended or adjusted under 35 U.S.C. 154(b) by 413 days.

(21) Appl. No.: 16/219,581

(22) Filed: Dec. 13, 2018

(65) Prior Publication Data

US 2019/0186898 A1   Jun. 20, 2019

Related U.S. Application Data

(60) Provisional application No. 62/599,871, filed on Dec. 18, 2017.

(51) Int. Cl.
*G01B 11/06* (2006.01)
*G01B 9/02* (2006.01)

(52) U.S. Cl.
CPC ...... *G01B 11/0666* (2013.01); *G01B 9/02084* (2013.01)

(58) Field of Classification Search
CPC .. G01B 9/02084; G01B 11/0666; G01B 11/06
USPC ................................................. 702/170, 171
See application file for complete search history.

(56) References Cited

U.S. PATENT DOCUMENTS

| | | | | |
|---|---|---|---|---|
| 6,393,384 | B1 * | 5/2002 | Anthony | G01N 29/11 356/432 |
| 9,880,133 | B1 * | 1/2018 | Stephanou | G01N 29/04 |
| 2002/0186379 | A1 * | 12/2002 | Drake, Jr. | G01B 17/025 356/502 |
| 2005/0004457 | A1 * | 1/2005 | Moilanen | A61B 8/4209 600/437 |
| 2006/0052979 | A1 * | 3/2006 | Park | G01B 11/0666 702/170 |
| 2006/0144147 | A1 * | 7/2006 | Ishimaru | G01B 11/0666 73/579 |

(Continued)

OTHER PUBLICATIONS

Alleyne, D. et al. "A two-dimensional Fourier transform method for the measurement of propagating multimode signals". J. Acoust. Soc. Am., vol. 89(3), Mar. 1991, pp. 1159-1168. (Year: 1991).*

(Continued)

*Primary Examiner* — Michael A Lyons
(74) *Attorney, Agent, or Firm* — Esplin & Associates, PC (57) ABSTRACT

A multi-mode approach for real-time inspection of structural components may be applied to rapid, wide area measurement of thickness of thick plate-like structures using full-field multi-mode response measurement and analysis. The approach may allow estimation of thickness from full-field multi-mode response to single-tone ultrasonic excitation in thick plates. The approach may utilize wavenumber information across all available wave modes in order to make wavenumber spectroscopy sensitive to changes in thickness for a broader range of nominal initial thicknesses.

20 Claims, 7 Drawing Sheets

(56) References Cited

U.S. PATENT DOCUMENTS

2014/0208852 A1* 7/2014 Instanes ................. G01B 17/02
 73/594
2015/0049343 A1* 2/2015 Shaked .............. G01B 9/02054
 356/503

OTHER PUBLICATIONS

Köstli, Kornel P. et al. "Two-dimensional photoacoustic imaging by use of Fourier-transform image reconstruction and a detector with an anisotropic response". Applied Optics, vol. 42, No. 10, Apr. 1, 2003, pp. 1899-1908. (Year: 2003).*
Schoonover, Robert W. et al. "Numerical investigation of the effects of shear waves in transcranial photoacoustic tomography with a planar geometry". Journal of Biomedical Optics, vol. 17(6), Jun. 2012, p. 061215-1-061215-11. (Year: 2012).*
Flynn, E.B. et al. "High-speed, non-contact, baseline-free imaging of hidden defects using scanning laser measurements of steady-state ultrasonic vibration". Structural Health Monitoring 2013, 2013, pp. 1-8. (Year: 2013).*
Moreau, Ludovic. "Monitoring ice thickness and elastic properties from the measurement of leaky guided waves: A laboratory experiment". J. Acoust. Soc. Am., vol. 142(5), Nov. 2017, pp. 2873-2880. (Year: 2017).*
Stull, et al. On the Theoretical Limitations in Estimating Thickness of a Plate-Like Structure From a Full-Field Single-Tone Response Lamb Wave Measurement, Los Alamos National Laboratory, Sep. 2017 (16 pages).

* cited by examiner

METHOD FOR REAL-TIME INSPECTION OF STRUCTURAL COMPONENTS

CROSS REFERENCE TO RELATED APPLICATIONS

This application claims the benefit of U.S. Provisional Application No. 62/599,871, filed Dec. 18, 2017 and entitled "METHOD FOR REAL-TIME INSPECTION OF STRUCTURAL COMPONENTS", which is hereby incorporated by reference in its entirety.

ACKNOWLEDGMENT OF GOVERNMENT SUPPORT

The disclosed technology was made with government support under Contract No. DE-AC52-06NA25396 awarded by the U.S. Department of Energy. The government has certain rights in the disclosed technology.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C 10518.

FIELD

The present invention generally relates to structural component inspection, and more particularly, to a multi-mode approach for real-time inspection of structural components that can be applied to rapid, wide area measurement of thickness of thick plate-like structures using full-field multi-mode response measurement and analysis.

BACKGROUND

For inspection of structural components, ultrasonic excitation of a plate-like structure, via a transducer, pulse laser, or other similar excitation device has been used. Excitation may be at a single ultrasonic frequency or multiple ultrasonic frequencies. Excitation is maintained throughout the scanning period, and a scanning laser-Doppler vibrometer (LDV) is used to measure steady-state full-field Lamb wave response.

Software controls a data acquisition unit (DAQ), controls steerable mirrors (e.g., galvanometric mirrors) to mark out the scan area, and controls the steerable mirrors to raster scan the area. The LDV measures the response at each point, and the software breaks measurement into pixels based on scan rate. The scan rate, spacing of pixels, and excitation frequency controlled via computer software. Software analysis tools provide local (pixel-by-pixel) wavenumber estimation, Fourier representation of data, a window about the wavenumber corresponding to peak intensity in the Fourier representation of the data, an estimate wavenumber on pixel-by-pixel basis, and a plot of the wavenumber. In carbon-fiber composite panels, a large shift in the wavenumber over a small area indicates delamination in this area. The intensity of the shift in the wavenumber indicates the proximity to the surface being scanned. In thin aluminum panels, the shift in wavenumber over a small area indicates thinning in that area. The intensity of the shift in the wavenumber indicates the degree of thinning. However, this approach analyzes data and estimates the wavenumber based on a single mechanical wave mode, $A_0$, which the software isolates via filtering. The wavenumber of a single mechanical wave mode is estimated on a pixel-by-pixel basis, allowing for localized detection of delaminations in carbon-fiber composite panels and thinning in thin aluminum panels. These delaminations/thinnings are indicated by a relatively dramatic shift in wavenumber. Also, this approach tends to encounter difficulty in analyzing waveforms when multiple mechanical wave modes are present with wavenumbers in close proximity to one another (as is the case in thick structural steel). Accordingly, an improved approach may be beneficial.

SUMMARY

Certain embodiments of the present invention may provide solutions to the problems and needs in the art that have not yet been fully identified, appreciated, or solved by conventional structural component inspection technologies. For example, some embodiments of the present invention pertain to a multi-mode approach for real-time inspection of structural components that can be applied to rapid, wide area measurement of thickness of thick plate-like structures using full-field multi-mode response measurement and analysis. The approach of some embodiments allows estimation of thickness from full-field multi-mode response to single-tone ultrasonic excitation in thick plates. The approach may utilize wavenumber information across all available wave modes in order to make wavenumber spectroscopy sensitive to changes in thickness for a broader range of nominal initial thicknesses.

In certain embodiments, a process includes exciting a structure using one or more single-tone ultrasonic frequencies that are sufficiently high to induce and measure a steady-state multi-mode response in a plate. The process also includes producing a two-dimensional Fourier representation of data from the measured steady-state multi-mode response and extracting a one-dimensional summary of the transformed data that depicts a relationship between one or more wave amplitudes and corresponding one or more wavenumbers in the measurement. The process further includes determining theoretical wavenumbers for a candidate set of possible thicknesses, where each theoretical wavenumber corresponds to an individual wave mode of mechanical waves propagating through the plate and derived using Rayleigh-Lamb equations. Additionally, the process includes forming a one-dimensional template for each candidate thickness that represents the expected summary for a plate of that thickness. The process also includes estimating unknown parameters for each template such that the template best fits the summary of the transformed data. The process further includes extracting a best estimate of thickness that corresponds to a fitted template that most closely matches the summary.

In some embodiments, a method of determining a thickness of a structure is provided. The method includes exciting the structure using one or more single-tone ultrasonic signals. The method can further include measuring a resulting steady-state multi-mode response in the structure. The method can further include producing transformed data corresponding to a two-dimensional Fourier representation of measurement data obtained from step (b). The method can further include extracting a one-dimensional summary of wavenumbers from the transformed data. The method can further include forming a set of one-dimensional templates corresponding to a set of possible thicknesses, wherein each one-dimensional template represents an expected one-dimensional summary of theoretical wavenumbers computed for the structure having one of the set of possible thicknesses, each theoretical wavenumber corresponding to an individual wave mode of a mechanical wave propagating through the structure having one of the set of possible thicknesses. The method can further include extracting a best estimate of the thickness of the structure from a selected one-dimensional template in the set of one-dimensional templates, the selected one-dimensional template determined to fit the one-dimensional summary of wavenumbers better than any other one-dimensional template in the set of one-dimensional templates.

In some embodiments, a method of determining a thickness of a structure is provided. The method can include receiving measurement data obtained from a measurement of a steady steady-state multi-mode response resulting from an excitation of the structure using one or more single-tone ultrasonic signals. The method can further include producing transformed data corresponding to a two-dimensional Fourier representation of the measurement data. The method can further include extracting a one-dimensional summary of wavenumbers from the transformed data. The method can further include forming a set of one-dimensional templates corresponding to a set of possible thicknesses, wherein each one-dimensional template represents an expected one-dimensional summary of theoretical wavenumbers computed for the structure having one of the set of possible thicknesses, each theoretical wavenumber corresponding to an individual wave mode of a mechanical wave propagating through the structure having one of the set of possible thicknesses. The method can further include extracting a best estimate of a thickness of the structure from a selected one-dimensional template in the set of one-dimensional templates, the selected one-dimensional template determined to fit the one-dimensional summary of wavenumbers better than any other one-dimensional templates in the set of one-dimensional templates.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to a multi-mode approach for real-time inspection of structural components that can be applied to rapid, wide area measurement of thickness of thick plate-like structures using full-field multi-mode response measurement and analysis. Preliminary laboratory results indicate that the approach of some embodiments is capable of estimating thickness in 19-millimeter-thick plates with 2% average error from a range of 15 meters and a scan rate of 8 square meters per minute. Such embodiments may be beneficial for the oil and gas industry (e.g., pipelines, floating oil rigs, naval vessel inspection, etc.), civil infrastructure (e.g., bridge support beams, decking, etc.), non-contact analysis of structures with minimal operational losses, and/or any other suitable industry or application without deviating from the scope of the invention.

In some embodiments, the approach allows estimation of thickness from full-field multi-mode response to single-tone ultrasonic excitation in thick plates. The approach may utilize wavenumber information across all available wave modes in order to make wavenumber spectroscopy sensitive to changes in thickness for a broader range of nominal initial thicknesses. Excitation the source may be achieved via an attached transducer, a pulse laser, or any other suitable ultrasonic device without deviating from the scope of the invention, producing vibrations at sufficiently high frequency to excite a multi-mode response. Measurement of full-field multi-mode response may be done via a LDV, an ultrasonic ping-catch system, a transducer detector, or any other suitable detection device without deviating from the scope of the invention.

Figure 1:
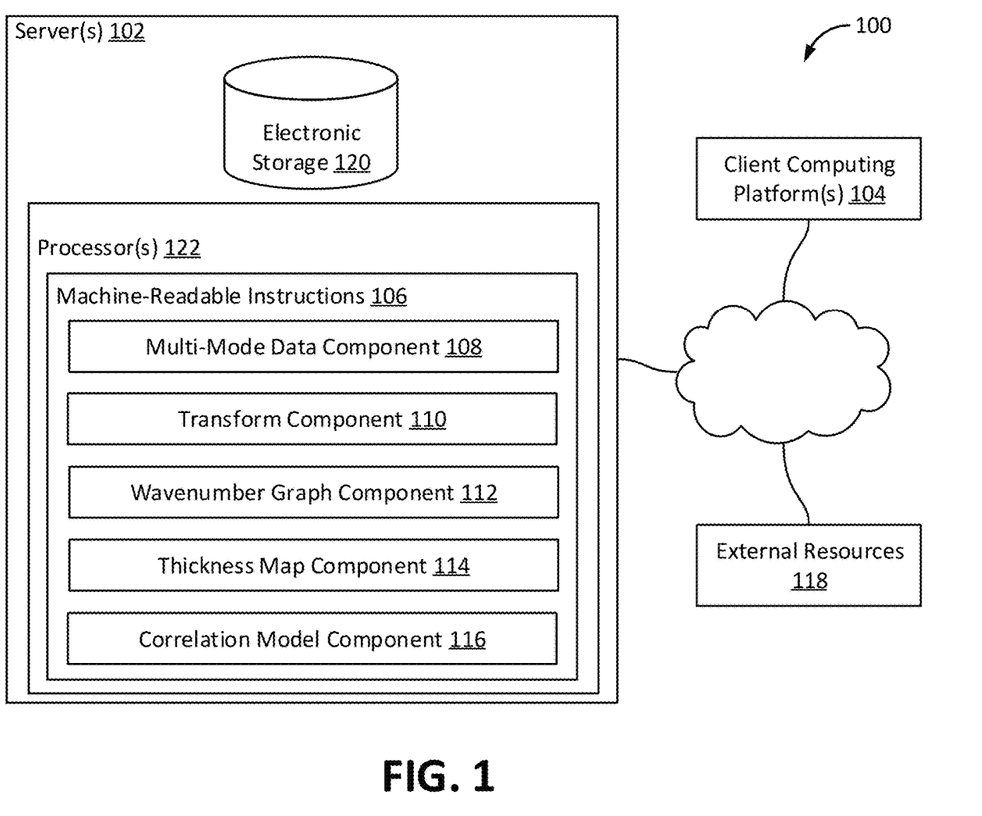
FIG. 1 illustrates a system configured for estimating a thickness of a structure using full-field steady-state measurements, according to an embodiment of the presently disclosed technology.

FIG. 1 illustrates a system 100 configured for estimating a thickness of a structural using full-field steady-state measurements, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a full-field steady-state measurement component 108, a Fourier representation component 110, a summary and template component 112, a thickness-wavenumber graph component 114, a best fit component 116, and/or other instruction components.

Figure 2:
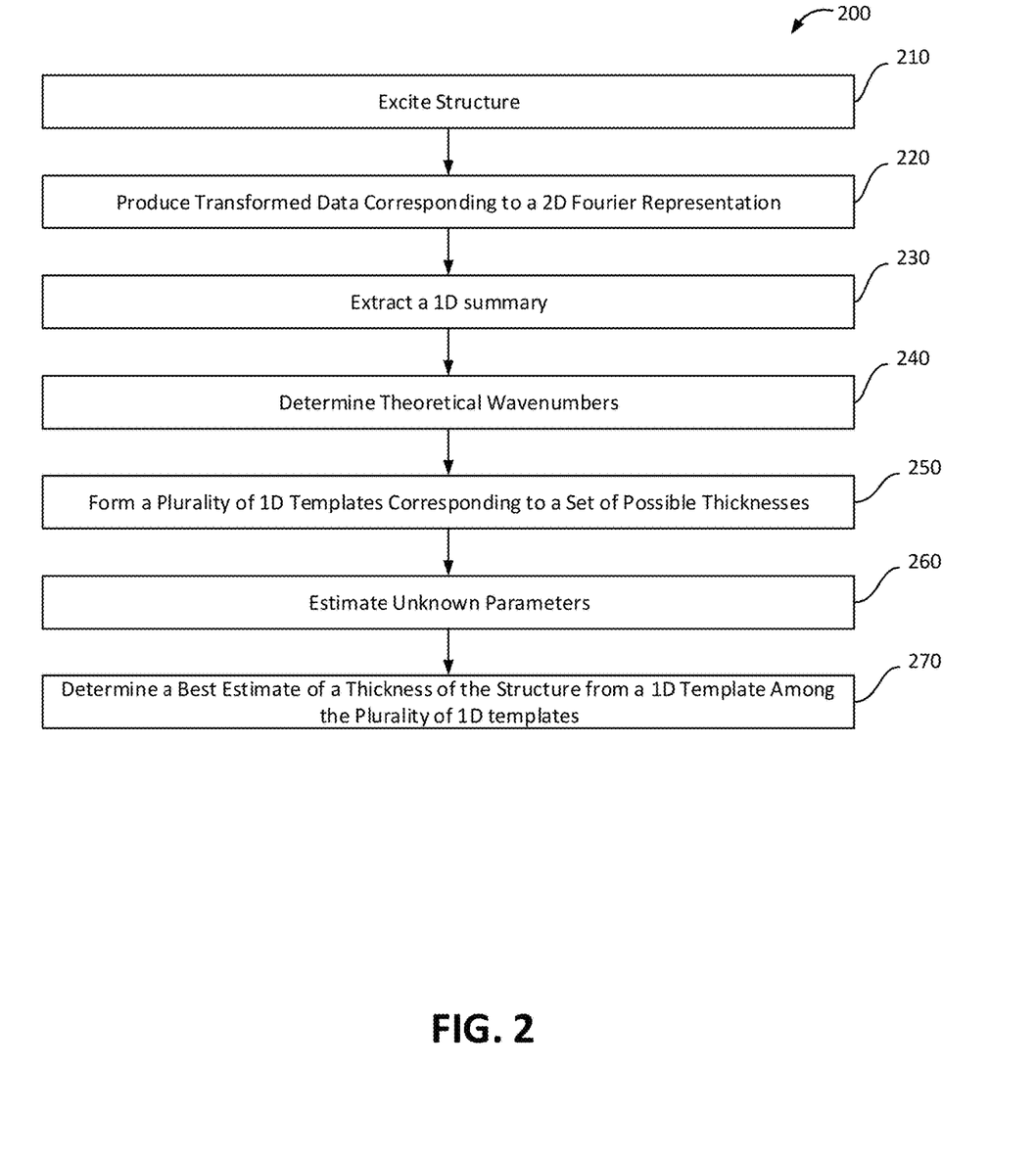
FIG. 2 is a flowchart illustrating a measurement and analysis process for performing inspection of structural components, according to an embodiment of the presently disclosed technology.

FIG. 2 is a flowchart 200 illustrating a measurement and analysis process for performing inspection of structural components, according to an embodiment of the present invention. The process begins with exciting a structure using one or more single-tone ultrasonic frequencies that are sufficiently high to induce and measure a steady-state multimode response (i.e., beyond the fundamental symmetric and anti-symmetric modes) in the plate at 210 using a scanning laser-Doppler vibrometer or another full-field measurement instrument. A two-dimensional Fourier representation of the data is produced (hereafter, "transformed data") at 220, yielding information on both spatial frequency ("wavenumber") and propagation direction. Post-processing of the data in step 220, may include correction for a measured plate orientation with respect to normal incidence of the LDV laser beam (i.e., correction for a measured angle of incidence), correction for an unknown plate orientation (i.e., correction for an unknown angle of incidence, etc. A one-dimensional summary of the transformed data (hereafter, "summary") is then extracted at 230.

Examples of a summary include, but are not limited to: (1) the transformed data corresponding to a single angle in polar coordinates; (2) an average of the transformed data over a prescribed set of angles in polar coordinates; (3) the transformed data corresponding to the angle in which the Fourier representation of the data carries the maximum energy; and (4) applying a prescribed norm to the transformed data with respect to angle in polar coordinates). It should be noted that steps 220 and 230 indicate postprocessing on the measurement data, while the remaining steps indicate steps taken to estimate thickness based on the postprocessed data.

For a candidate set of possible thicknesses, the theoretical wavenumbers are determined at 240, with each theoretical wavenumber corresponding to an individual wave mode of mechanical waves propagating through the mechanical plate using the Rayleigh-Lamb equations. For each candidate thickness, a one-dimensional "template" is formed at 250 that represents the expected "summary" for a plate of that thickness using the wavenumbers of the individual modes computed in step 240. For each "template", unknown parameters, such as relative mode amplitudes, are estimated at 260 so that the "template" best fits the summary of the transformed data (e.g., in the sense of least-squares, maximum likelihood, or another appropriate fitting scheme). The best estimate of thickness that corresponds to the fitted "template" that most closely matches the "summary" is then extracted at 270.

Figure 3:
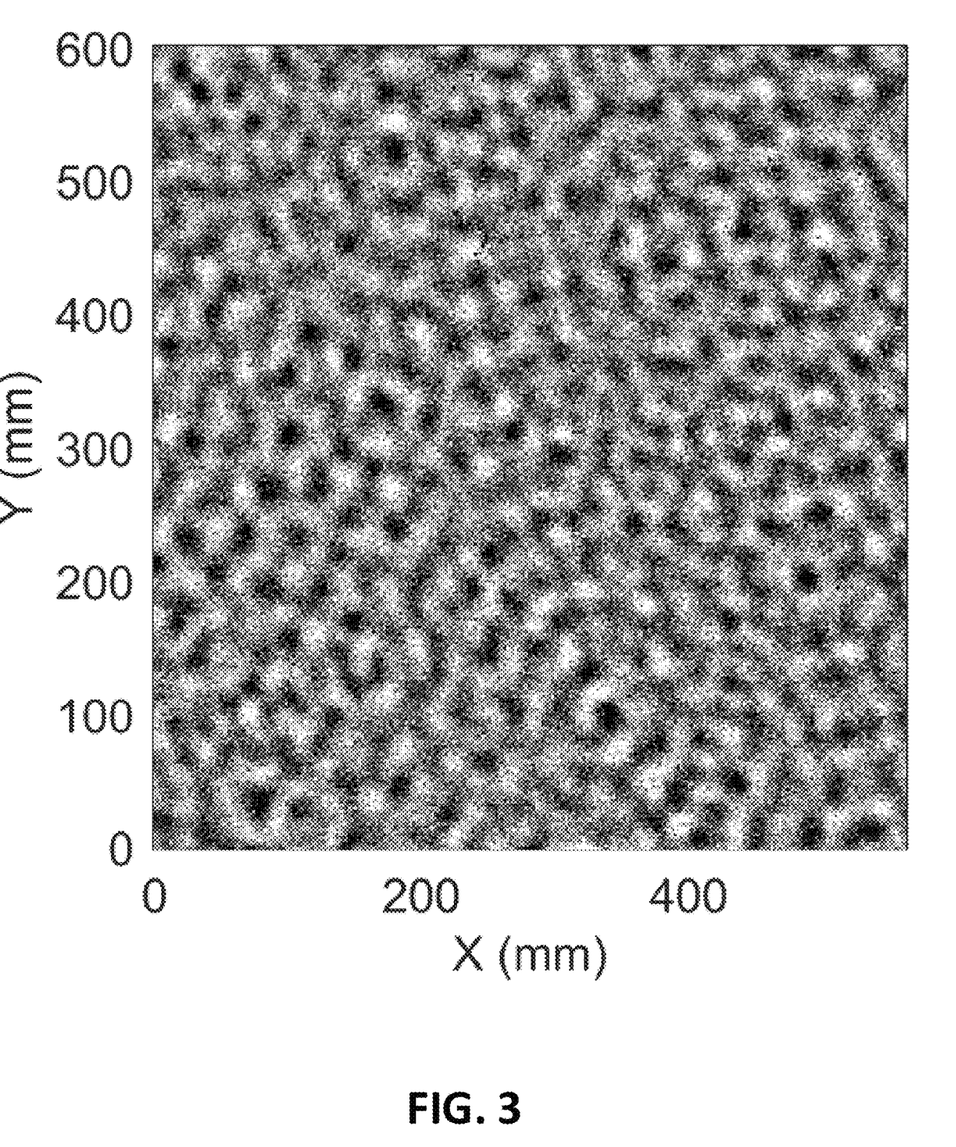
FIG. 3 illustrates example full-field steady-state measurement, according to an embodiment of the presently disclosed technology.

FIG. 3 may illustrate full-field steady-state measurement of a structural component as a function of position. As described above, the structure may be excited using an attached transducer, a pulse laser, and/or any other device that generates sound, ultrasound, and/or vibrations. The multi-mode response may include modes beyond fundamental symmetric and anti-symmetric modes. The pattern illustrates the amplitudes of the multi-mode measurement as a function of position on the structure. The amplitudes may represent an energy of the multi-mode response at a given time and position on the structure.

Figure 4:
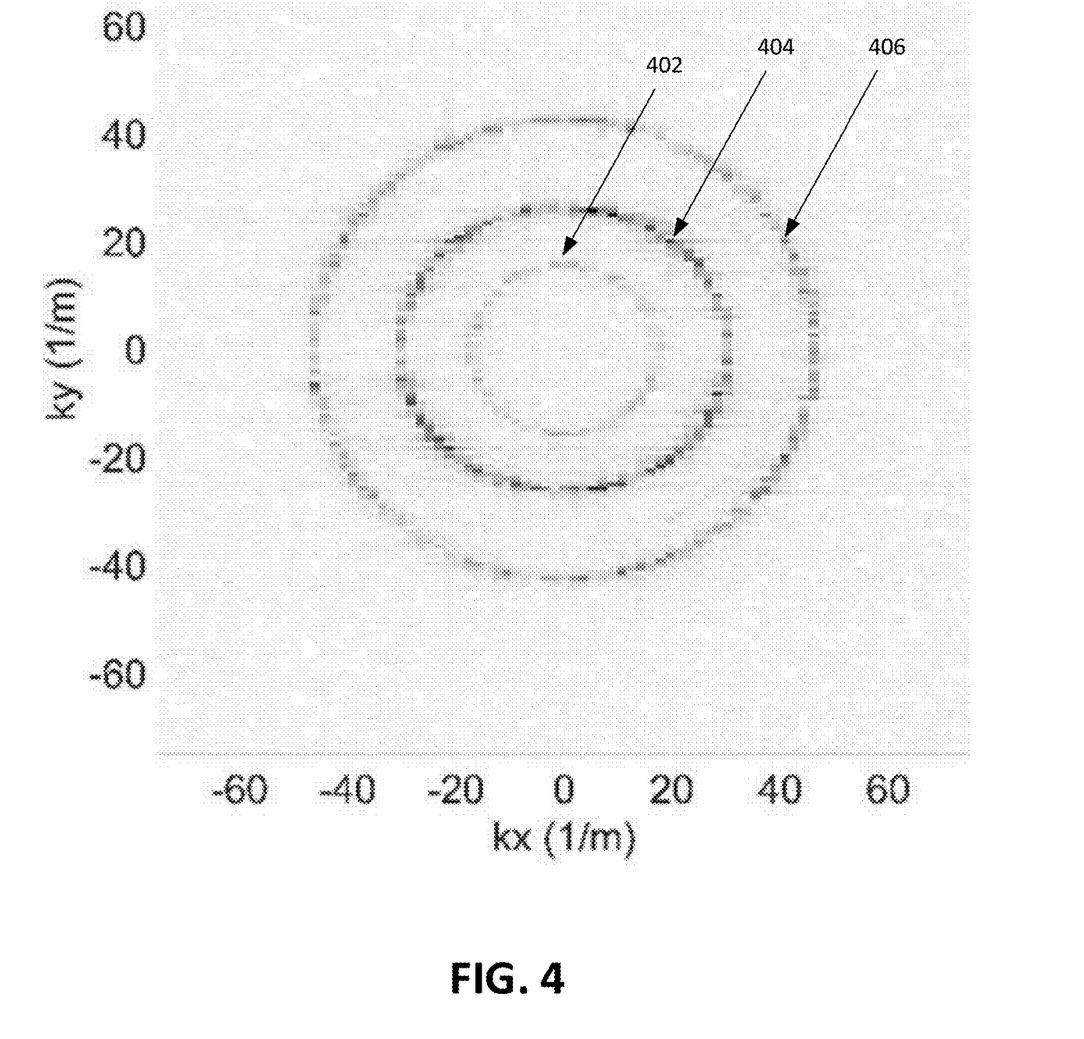
FIG. 4 illustrates an example 2D Fourier representation of a full-field steady-state measurement, according to an embodiment of the presently disclosed technology.

FIG. 4 illustrates a Fourier representation of the full-field steady-state measurement of FIG. 3. The 2D Fourier representation may illustrate the full-field steady-state measurement in a wavenumber domain. The 2D Fourier representation may specify spatial frequency and propagation direction of the full-field steady-state measurement. As illustrated, the energy of a given mode may correspond to a lightness or darkness in the 2D Fourier representation. As illustrated, ring 404, which is darker, may have more energy than ring 402 and ring 406. Ring 402 may have more energy than ring 406.

Figure 5:
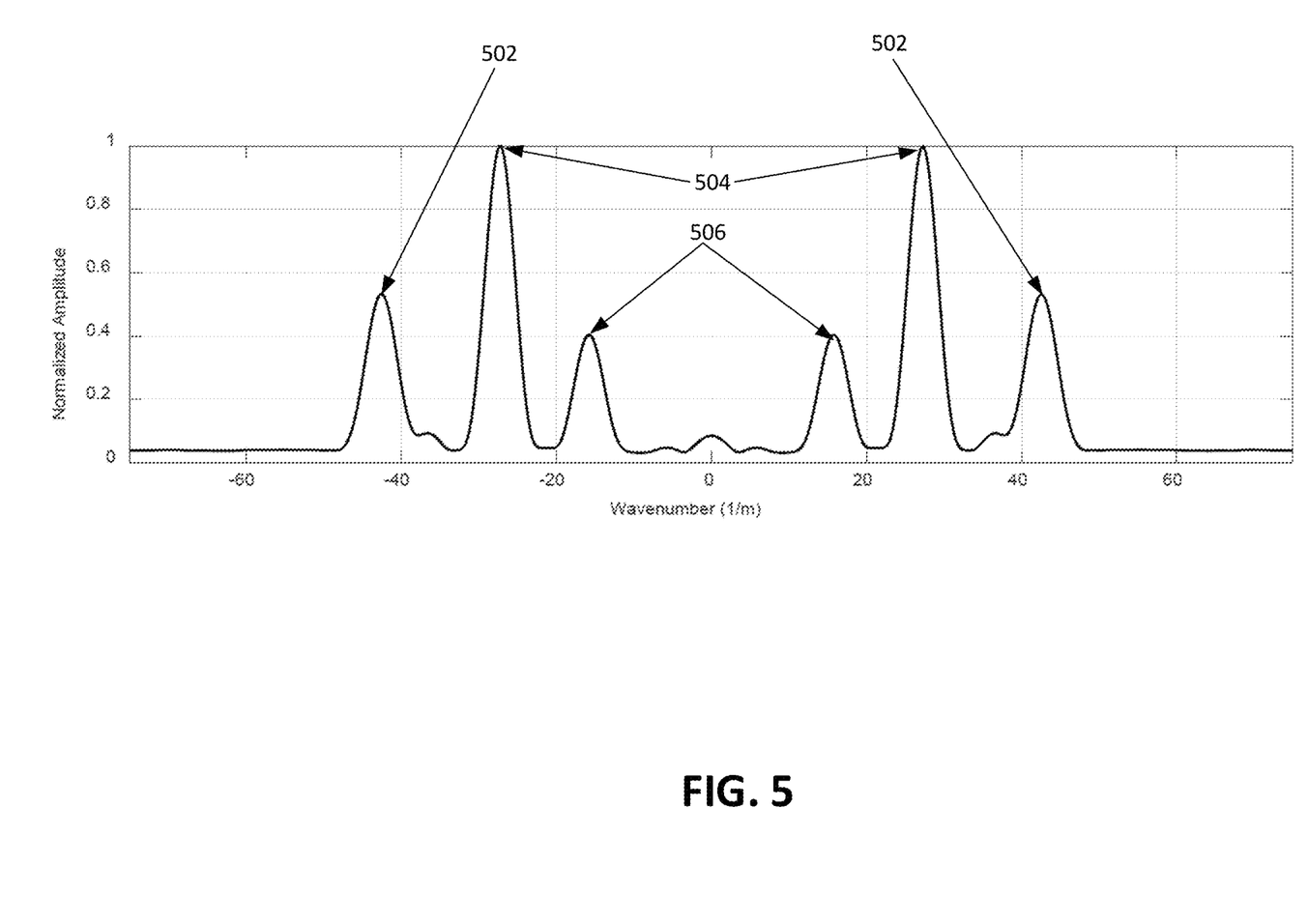
FIG. 5 illustrates an example summary, according to an embodiment of the presently disclosed technology.

FIG. 5 may illustrate a summary with wavenumbers on an x-axis and normalized wave energy on the y-axis. The peaks of the summary may correspond to the energy and wavenumbers of the rings in FIG. 4. Ring 406 has maximum and minimum $k_x$ and/or $k_y$ values at around 18 and −18 which correspond to peaks 506 at about 18 and −18; ring 404 has maximum and minimum $k_x$ and/or $k_y$ values at around 30 and −30 which correspond to peaks 504 at about 30 and −30, and ring 402 has maximum and minimum $k_x$ and/or $k_y$ values at around 42 and −42 which correspond to peaks 502 at about 42 and −42.

Figure 6:
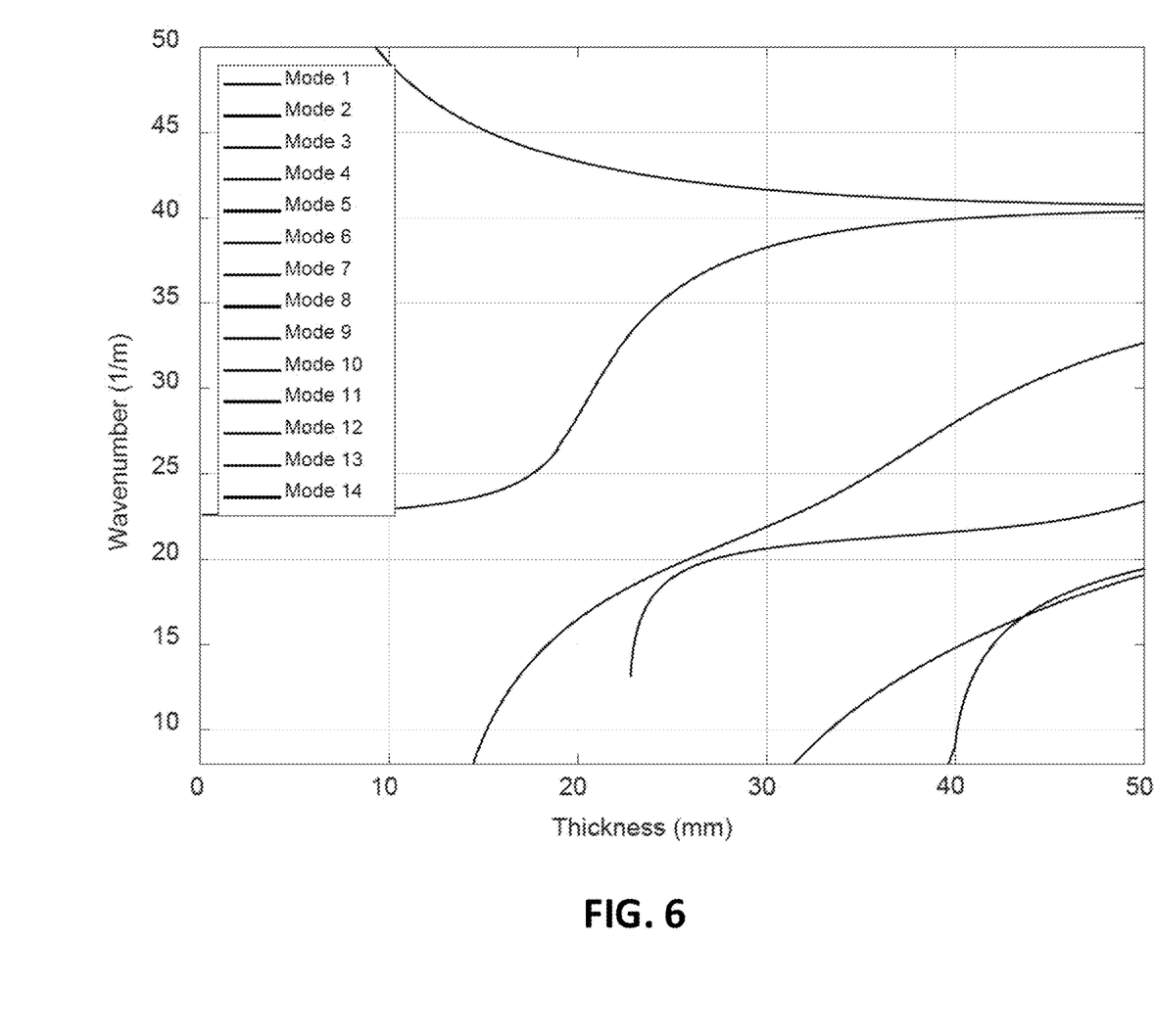
FIG. 6 illustrates an example thickness-wavenumber graph, according to an embodiment of the presently disclosed technology.

FIG. 6 illustrates a thickness-wavenumber graph with wavenumbers on a y-axis and thicknesses on the x-axis. Each curve may represent a mode of the multi-mode response. The curve depicts theoretical wavenumbers for a candidate set of thicknesses. For example, at a thickness value of 20 mm, there may be three corresponding wavenumbers: about 17, about 28, and about 43.

Figure 7:
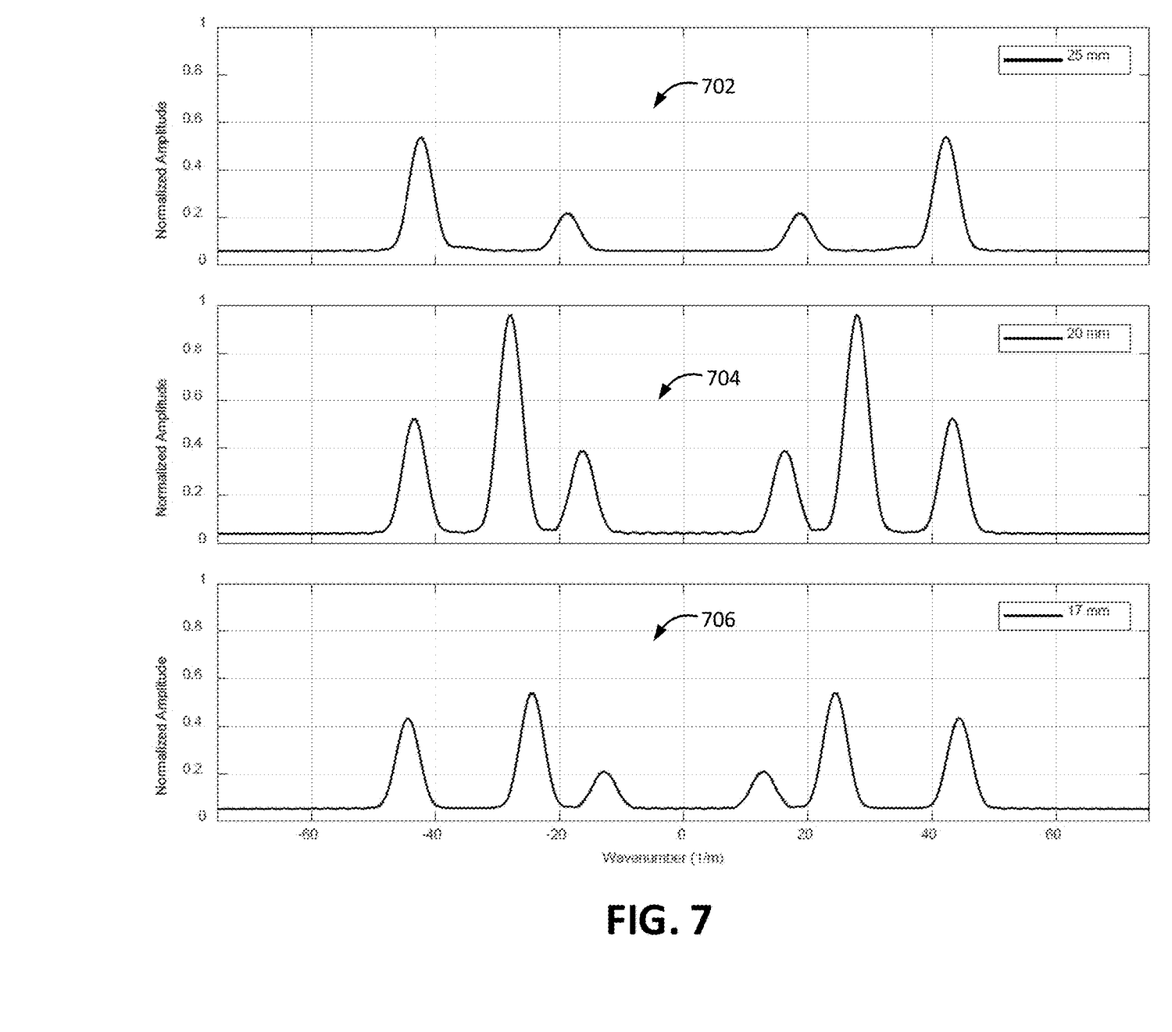
FIG. 7 illustrates a plurality of example templates, according to an embodiment of the presently disclosed technology.

FIG. 7 illustrates a plurality of 1D templates corresponding to a candidate set of possible thicknesses with wavenumbers on an x-axis and normalized wave energy on the y-axis. As illustrated, graph 704 may depict a thickness of about 20 mm. Graph 704 has peaks at about 17 and −17, about 28 and −28, and about 43 and −43, which corresponds to the thickness value described above in FIG. 6. Graph 702 and graph 706 may correspond to a thickness of about 25 mm and about 17 mm, respectively.

There are various significant differences and advantages between previous approaches and some embodiments of the present invention. For instance, previously, data was analyzed and the wavenumber was estimated based on a single mechanical wave mode, $A_0$, which software isolates via filtering. However, some embodiments utilize all mechanical wave modes present in the plate (i.e., all mechanical wave modes predicted to be present by the Rayleigh-Lamb equations), and produce templates/best fit results based on all available wave modes and their corresponding wavenumbers.

Also, prior approaches estimate the wavenumber of a single mechanical wave mode on a pixel-by-pixel basis, allowing for localized detection of delaminations in carbon-fiber composite panels and thinning in thin aluminum panels. These delaminations/thinnings are indicated by a relatively dramatic shift in wavenumber. However, some embodiments estimate the thickness of thick structural steel plates across the whole scan area using all mechanical wave modes present in the plate response in order to detect wide-area wasting/corrosion (i.e., loss of mass over the entire scan area). Changes in thickness of thick structural steel plates are indicated by subtle shifts in wavenumber across all modes present in the plate.

Furthermore, previous approaches tend to encounter difficulty in analyzing waveforms when multiple mechanical wave modes are present with wavenumbers in close proximity to one another (as is the case in thick structural steel). However, some embodiments are specifically designed to analyze wave forms in which multiple mechanical wave modes are present. The proximity of distinct wavenumbers does not adversely affect analysis. Rather, it is simply built into the template.

In some embodiments, significant advantages are provided at a frequency-thickness product in steel of approximately 10 MHz-μm or more. This corresponds to a value of approximately 3 in the x-axis of the Dispersion curves plot included in this disclosure. The Dispersion curves are an input of the analysis and they are included to display the nature of mechanical waves in thick structural steel plates.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an embodiment, a process includes exciting a structure using one or more single-tone ultrasonic frequencies that are sufficiently high to induce and measure a steady-state multi-mode response in a plate. The process also includes producing a two-dimensional Fourier representation of data from the measured steady-state multi-mode response and extracting a one-dimensional summary of the transformed data. The process further includes determining theoretical wavenumbers for a candidate set of possible thicknesses, where each theoretical wavenumber corresponds to an individual wave mode of mechanical waves propagating through the plate using Rayleigh-Lamb equations. Additionally, the process includes forming a one-dimensional template for each candidate thickness that represents the expected summary for a plate of that thickness. The process also includes estimating unknown parameters for each template such that the template best fits the summary of the transformed data. The process further includes extracting a best estimate of thickness that corresponds to a fitted template that most closely matches the summary.

What is claimed is:

1. A method of determining a thickness of a structure, the method comprising:
   (a) exciting the structure using one or more single-tone ultrasonic signals;
   (b) measuring a resulting steady-state multi-mode response in the structure;
   (c) producing transformed data corresponding to a two-dimensional Fourier representation of measurement data obtained from step (b);
   (d) extracting a one-dimensional summary of wavenumbers from the transformed data;
   (e) forming a set of one-dimensional templates corresponding to a set of possible thicknesses, wherein each one-dimensional template represents an expected one-dimensional summary of theoretical wavenumbers computed for the structure having one of the set of possible thicknesses, each theoretical wavenumber corresponding to an individual wave mode of a mechanical wave propagating through the structure having one of the set of possible thicknesses; and
   (f) extracting a best estimate of the thickness of the structure from a selected one-dimensional template in the set of one-dimensional templates, the selected one-dimensional template determined to fit the one-dimensional summary of wavenumbers better than any other one-dimensional template in the set of one-dimensional templates.

2. The method of claim 1, wherein the structure is a plate.

3. The method of claim 1, wherein the structure is excited in step (a) using one or more of an ultrasonic transducer and a pulse laser.

4. The method of claim 3 further comprising performing a post-processing on the measurement data, the post-processing including making a correction for a measured angle of incidence of a laser beam corresponding to the scanning laser-Doppler vibrometer.

5. The method of claim 1, wherein the resulting steady-state multi-mode response is measured using one or more of a scanning laser-Doppler vibrometer and a transducer.

6. The method of claim 5, wherein the one-dimensional summary includes the transformed data corresponding to a single angle in the polar coordinates.

7. The method of claim 5, wherein the one-dimensional summary includes an average of the transformed data over a prescribed set of angles in the polar coordinates.

8. The method of claim 5, wherein the one-dimensional summary includes the transformed data corresponding to an angle in which the Fourier representation of the data carries the maximum energy.

9. The method of claim 5, wherein the one-dimensional summary includes the transformed data, where a prescribed norm is applied to the transformed data with respect to an angle in the polar coordinates.

10. The method of claim 1, wherein the two-dimensional Fourier representation of the measurement data is produced in polar coordinates.

11. A method of determining a thickness of a structure, the method comprising:
   (a) receiving measurement data obtained from a measurement of a steady steady-state multi-mode response resulting from an excitation of the structure using one or more single-tone ultrasonic signals;

(b) producing transformed data corresponding to a two-dimensional Fourier representation of the measurement data;
(c) extracting a one-dimensional summary of wavenumbers from the transformed data;
(d) forming a set of one-dimensional templates corresponding to a set of possible thicknesses, wherein each one-dimensional template represents an expected one-dimensional summary of theoretical wavenumbers computed for the structure having one of the set of possible thicknesses, each theoretical wavenumber corresponding to an individual wave mode of a mechanical wave propagating through the structure having one of the set of possible thicknesses; and
(e) extracting a best estimate of a thickness of the structure from a selected one-dimensional template in the set of one-dimensional templates, the selected one-dimensional template determined to fit the one-dimensional summary of wavenumbers better than any other one-dimensional templates in the set of one-dimensional templates.

12. The method of claim 11, wherein the theoretical wavenumbers are computed using Rayleigh-Lamb equations.

13. The method of claim 11, further comprising estimating at least one unknown parameter for the set of one-dimensional templates, such that a given one-dimensional template best fits the one-dimensional summary.

14. The method of claim 13, wherein the at least one unknown parameter comprises a relative mode amplitude.

15. The method of claim 13, wherein a best fit is based on one or more of a least squares or maximum likelihood fitting scheme.

16. The method of claim 11, wherein the selected one-dimensional template is determined to fit the one-dimensional summary of wavenumbers better than any other one-dimensional template in the set of one-dimensional templates based on estimation of relative mode amplitudes of the template and the summary.

17. A system configured to determine a thickness of a structure, the system comprising:
electronic storage; and
one or more physical computer processors configured by machine-readable instructions to:
(a) receive, from the electronic storage, measurement data obtained from a measurement of a steady steady-state multi-mode response resulting from an excitation of the structure using one or more single-tone ultrasonic signals;
(b) produce, using the one or more physical computer processors, transformed data corresponding to a two-dimensional Fourier representation of the measurement data;
(c) extract, using the one or more physical computer processors, a one-dimensional summary of wavenumbers from the transformed data;
(d) form, using the one or more physical computer processors, a set of one-dimensional templates corresponding to a set of possible thicknesses, wherein each one-dimensional template represents an expected one-dimensional summary of theoretical wavenumbers computed for the structure having one of the set of possible thicknesses, each theoretical wavenumber corresponding to an individual wave mode of a mechanical wave propagating through the structure having one of the set of possible thicknesses; and
(e) extract, using the one or more physical computer processors, a best estimate of a thickness of the structure from a selected one-dimensional template in the set of one-dimensional templates, the selected one-dimensional template determined to fit the one-dimensional summary of wavenumbers better than any other one-dimensional templates in the set of one-dimensional templates.

18. The system of claim 17, wherein the structure is a plate that is thicker than 10 MHz-μm.

19. The system of claim 17, wherein the theoretical wavenumbers are computed using Rayleigh-Lamb equations.

20. The system of claim 17, wherein the one-dimensional summary includes an average of the transformed data over a prescribed set of angles.

* * * * *